Nov. 22, 1966   T. J. HENNIGAN ETAL   3,287,174
PREVENTION OF PRESSURE BUILD-UP IN ELECTROCHEMICAL CELLS
Filed Nov. 12, 1963

INVENTORS.
THOMAS J. HENNIGAN
PAUL C. DONNELLY
BY  CHARLES F. PALANDATI, JR.

Earl Levy
ATTORNEYS

United States Patent Office 3,287,174
Patented Nov. 22, 1966

3,287,174
PREVENTION OF PRESSURE BUILD-UP IN ELECTROCHEMICAL CELLS
Thomas J. Hennigan, Chillum Terrace, Paul C. Donnelly, Greenbelt, and Charles F. Palandati, Jr., Hyattsville, Md., assignors to the United States of America as represented by the Administrator of the National Aeronautics and Space Administration
Filed Nov. 12, 1963, Ser. No. 323,182
2 Claims. (Cl. 136—179)

The invention described herein may be manufactured and used by or for the Government of the United States of America for governmental purposes without the payment of any royalties thereon or therefor.

The present invention relates to means for reducing pressure build-up resulting from hydrogen gas being evolved from electrochemical cells, and more particularly to means for chemically reacting with the hydrogen gas evolving from electrochemical cells to prevent pressure build-up therefrom.

Secondary electrochemical cells such as lead-lead oxide, nickel oxide-cadmium, nickel oxide-iron, silver oxide-lead, silver oxide-zinc, silver oxide-cadmium and the like evolve hydrogen gas during storage, discharge or charge thereof. Now, if such cells are confined in a closed space, the evolution of the hydrogen gas will effect a pressure rise than can destroy the housing or vessel enclosing the cells, as well as, damage surrounding equipment and be hazardous to personnel. In addition, if oxygen or other oxidizing agents are within the closed space, there is always the added hazard of there being a possibility of an explosion.

The prior art methods of reducing the hazards caused by hydrogen gas being evolved from electrochemical cells include the use of activated charcoal to absorb the hydrogen gas and the reaction of oxygen with the hydrogen gas in the presence of a palladium catalyst to form water. Activated charcoal is not effective where space and weight requirements must be taken into account because of the large quantity of charcoal required to absorb the evolved hydrogen gases; and the reaction of oxygen with the hydrogen gas in the presence of palladium catalyst has proven to be unreliable because of the poisoning of the palladium by the reaction.

The use of palladium oxide in the manner that will be described hereinafter has the advantage of preventing pressure build-up and eliminating the explosion hazard caused by the evolution of hydrogen gas from electrochemical cells. In addition, only a small quantity of palladium oxide is required to react with a large volume of hydrogen gas; and the paladium oxide is not poisoned by the reaction.

The above advantages are attained by powdered palladium oxide (PdO) being confined in the same closed space wherein the electrochemical cells are located or in contact with the cells themselves and reacting with the volved hydrogen ($H_2$) to form water ($H_2O$) and palladium (Pd).

The exact nature of this invention, as well as other objects and advantages thereof, will be readily apparent from consideration of the following specification relating to the annexed drawing in which.

Figure 1:
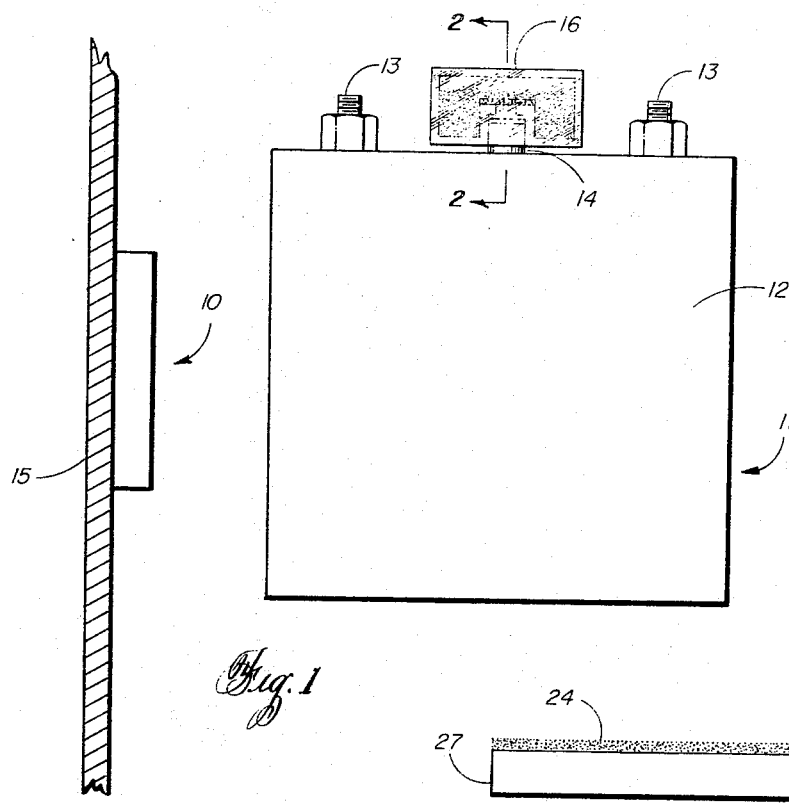
FIGURE 1 is a front view of an electrochemical cell housed within a confined space wherein a cap is affixed to the cell to form one embodiment of the invention and a coated member is positioned in the confined space to form another embodiment of the invention.

Referring now to the drawing, there is shown in FIGURE 1, housed within a closed chamber 15, electrochemical cell 11 having housing 12, terminals 13 and vent 14. A cap 16 fits about vent 14, and a coated member 10 is positioned within closed chamber 15. Both cap 16 and coated member 10 will be explained in detail hereinafter.

Figure 2:
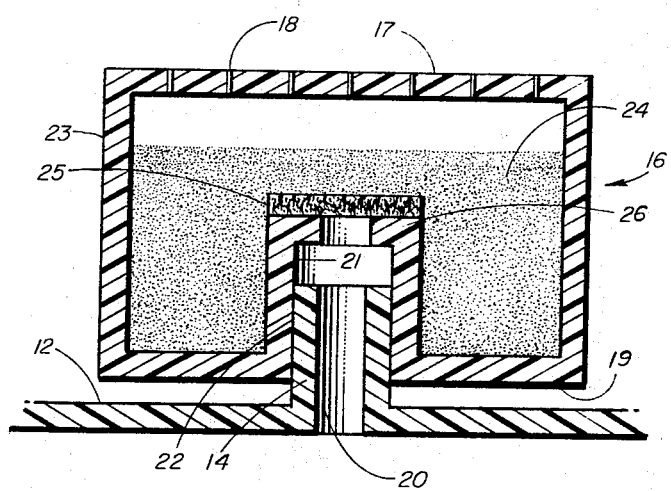
FIGURE 2 is a cross-sectional view of the cap of FIGURE 1 taken along line 2—2 thereof.

Cap 16, shown in more detail in FIGURE 2, is a closed container of plastic material or the like comprising a top member 17 havig a plurality of small holes 18 therein; a base member 19 including an enlarged walled aperture 20 having an inner surface 21 thereof surrounding and making a friction tight fit with outer surface 22 of vent 14; and an up-right wall 23 formed integral with and connecting top member 17 to base member 19. Holes 18 are provided to permit unreactive gases to escape from housing 12.

Contained within cap 16 is powdered palladium oxide 24 and a porous disc 25 of filter paper or the like, the disc resting on a shoulder 26 formed by the wall of aperture 20 and behaving as a closure to prevent the powdered palladium oxide 24 from falling into vent 14 while at the same time, because of being porous, permitting the hydrogen gas evolved from the cell to pass therethrough and react with the palladium oxide. Shoulder 26 of the wall of aperture 20 is bent inwardly from the wall itself, thereby reducing the dimension of the aperture at the point where it is surrounded by shoulder 26.

When hydrogen gas is evolved by an electrochemical cell 11 during the storage, charge or discharge thereof as a result of electrode reactions with the electrolyte, it passes through vent 14 via aperture 20 and porous disc 25 into the region of cap 16 containing the palladium oxide 24. The hydrogen gas in diffusing through and flowing adjacent to the palladium oxide reacts therewith as follows:

$$PdO + H_2 \rightarrow Pd + H_2O$$

or $$PdO_2 + 2H_2 \rightarrow Pd + 2H_2O$$

to form water and paladium depending on whether PdO (palladium monoxide) or $PdO_2$ (palladium dioxide) is the reactant. It should also be noted that a mixture of these reactants will work equally as well to react with the hydrogen, thereby eliminating the pressure build-up problem in closed chamber 15.

The formation of palladium (Pd) acts to further reduce the hydrogen pressure where oxygen is present as it will act as a catalyst and cause the following reaction:

$$2H_2 + O_2 \xrightarrow{Pd} 2H_2O$$

However, as already explained in connection with the description of the prior art, presented above, the efficiency of this reaction is limited due to the poisoning of the palladium.

Figure 3:
FIGURE 3 is a more detailed showing of the coated member of FIGURE 1.

Coated member 10, forming embodiment of the invention, is shown in FIGURE 3, as comprises a base 27 having palladium oxide 24 in contact therewith. More particularly, base member 27 can be chosen to be a plastic sheet such as cellulose acetate having a thin film of powdered palladium oxide encapsulated thereon; or a palladium plated sheet of metal such as copper, stainless steel or the like upon which the oxide has been formed.

Again, as described above in connection with cap embodiment of the invention, the hydrogen gas evolved by electrochemical cell 11 passes from vent 14 and reacts with palladium oxide 24 on base 27 to prevent the pressure build-up within electrochemical cell 11 and closed chamber 15.

The foregoing disclosure relates to preferred embodiments of the invention. Numerous modifications or alterations may be made therein without departing from the spirit and scope of the invention set forth in the appended claims.

What is claimed is:
1. In a closed chamber housing an electrochemical cell which produces a pressure build-up in said chamber from hydrogen gas evolved as a by product of its electrochemical reaction, the improvement comprising: a plastic holder; powdered palladium oxide coated on said holder; said plastic holder with said palladium oxide coated thereon positioned in said closed chamber, whereby said hydrogen gas reacts with said palladium in the following manner:

$$PdO + H_2 \rightarrow Pd + H_2O$$

thereby eliminating any accumulation of hydrogen gas and preventing any pressure build-up due to hydrogen accumulation.

2. In a closed chamber housing an electrochemical cell which produces a pressure build-up in said chamber from hydrogen gas evolved as a by product of its electrochemical reaction, the improvement comprising: a palladium plated sheet of metal having palladium oxide formed thereon; said palladium plated sheet with the palladium oxide being positioned in said closed chamber, whereby said hydrogen gas reacts with said palladium oxide in the following manner:

$$PdO + H_2 \rightarrow Pd + H_2O$$

thereby eliminating any accumulation of hydrogen gas and preventing any pressure build-up due to hydrogen accumulation.

References Cited by the Examiner
UNITED STATES PATENTS

| | | | |
|---|---|---|---|
| 2,615,062 | 10/1952 | Craig | 136—179.1 |
| 2,687,449 | 8/1954 | Gulick et al. | 136—179.1 |

WINSTON A. DOUGLAS, *Primary Examiner*
ALLEN B. CURTIS, *Examiner.*
D. L. WALTON, *Assistant Examiner.*